(No Model.)
J. C. HENRY.
CAR BRAKE.
No. 497,544.  Patented May 16, 1893.
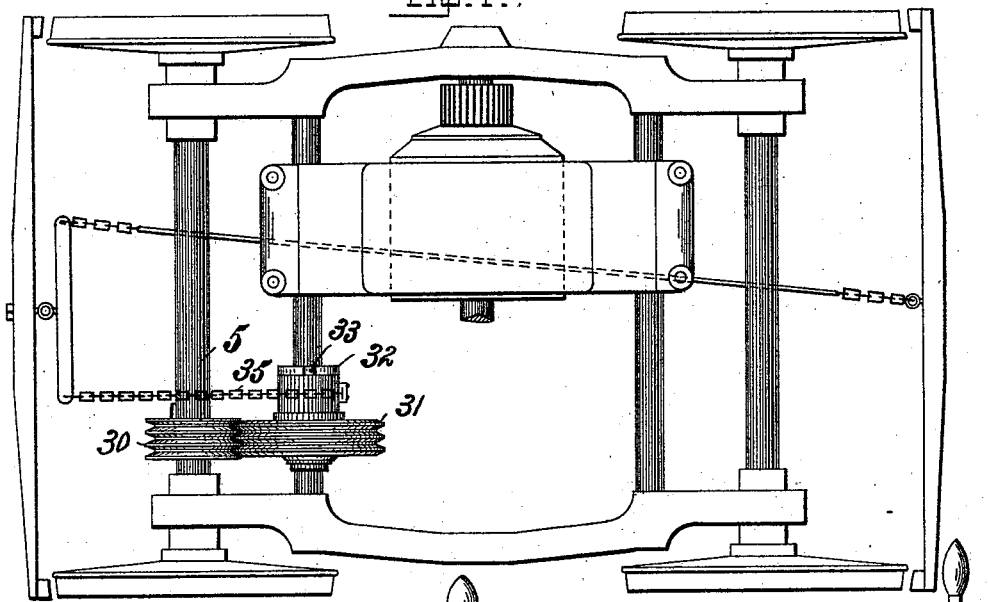
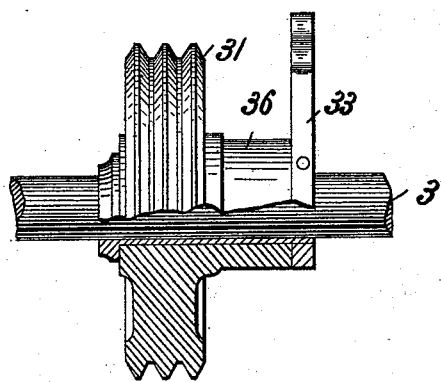
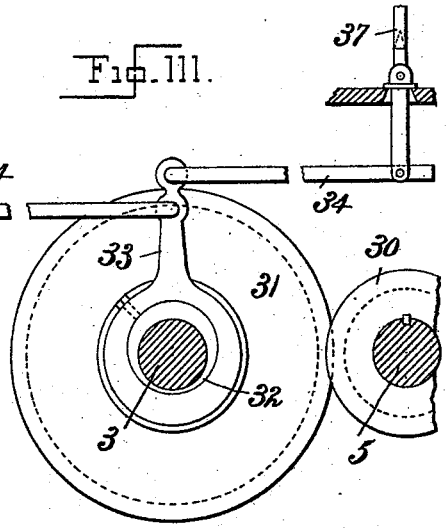
Witnesses
Wm H. Courtland
M. V. Bidgood
Inventor
John C Henry
By Knight Bros
Attys.

UNITED STATES PATENT OFFICE.

JOHN C. HENRY, OF WESTFIELD, NEW JERSEY.

CAR-BRAKE.

SPECIFICATION forming part of Letters Patent No. 497,544, dated May 16, 1893.

Original application filed January 2, 1892, Serial No. 416,838. Divided and this application filed March 14, 1893. Serial No. 465,879. (No model.)

*To all whom it may concern:*

Be it known that I, JOHN C. HENRY, a citizen of the United States, residing at Westfield, in the county of Union and State of New Jersey, have invented certain new and useful Improvements in Car-Brakes, of which the following is a specification.

The present improvement, which is illustrated and described in my application, Serial No. 416,838, filed January 2, 1892, of which the present application is a division, is more especially intended for use on electric cars, but it is applicable to other forms of vehicles. It comprises mechanism whereby the motion of the axle may be utilized to wind up a brake chain for applying the brakes.

In the accompanying drawings which form a part of this specification: Figure I is a plan view of an electric car truck to which my invention is applied. Fig. II is a partly sectional end view of the shiftable friction drums and allied parts. Fig. III is a side elevation of the friction drums showing also the operating levers and rods.

I employ preferably two toothless wheels 30, 31, preferably V-grooved, as shown, so as to increase the bearing surface. The smaller one 30 is keyed to one car axle 5, and the other is supported by an eccentric 32 which is free to move on the cross-bar 3 under the action of lever 33 and rods 34 or other connection controlled by hand levers 37 on either or both car platforms. By pulling on the rod 34 at the car platform and shifting the lever 33 and its eccentric 32, the friction wheel 31 may be thrown against the wheel 30 so that the rotation of the axle, being imparted to the wheel 31, will wind up a brake chain 35 on a sleeve or drum 36, which is integral with the wheel 31, and so apply the brakes.

Having thus described my invention, the following is what I claim as new therein and desire to secure by Letters Patent:

1. In a motor truck, in combination with an axle 5, having a friction wheel 30 thereon, the cross-bar 3, having an eccentric 32 loose thereon, a friction-wheel 31 on said eccentric, adapted to be brought in contact with the wheel 30, a lever 33 controlling said eccentric, and a drum or sleeve connected to said wheel 31 and having connection with the brake or brakes, substantially as set forth.

2. In combination with a truck frame, an automatic friction brake having one of its members keyed to the truck axle, the other loosely mounted on an eccentric surrounding an independent stationary shaft and means for engaging or disengaging said parts by shifting the eccentric whereby a chain or cable is tightened or released.

3. In combination with a truck frame supporting a motor, a fast and loose connection consisting of a pair of friction wheels and an eccentric within one of said friction wheels by which they are thrown into or out of engagement by shifting.

JOHN C. HENRY.

Witnesses:
HARRY E. KNIGHT,
SUSIE A. HENRY.